United States Patent
Sato et al.

(10) Patent No.: US 9,451,665 B2
(45) Date of Patent: Sep. 20, 2016

(54) IMAGE PICKUP AUXILIARY LIGHT SOURCE DEVICE AND DIGITAL CAMERA PROVIDED WITH SAME

(71) Applicant: Rohm Co., Ltd., Kyoto (JP)

(72) Inventors: Tadayoshi Sato, Kyoto (JP); Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 11 days.

(21) Appl. No.: 14/365,716

(22) PCT Filed: Dec. 10, 2012

(86) PCT No.: PCT/JP2012/081929
§ 371 (c)(1),
(2) Date: Jun. 16, 2014

(87) PCT Pub. No.: WO2013/094457
PCT Pub. Date: Jun. 27, 2013

(65) Prior Publication Data
US 2014/0340572 A1    Nov. 20, 2014

(30) Foreign Application Priority Data
Dec. 20, 2011  (JP) .................................. 2011-278423

(51) Int. Cl.
*H05B 33/08* (2006.01)
*H04N 5/232* (2006.01)
(Continued)

(52) U.S. Cl.
CPC ............. *H05B 33/0845* (2013.01); *G03B 7/08* (2013.01); *G03B 15/05* (2013.01); *H04N 5/225* (2013.01);
(Continued)

(58) Field of Classification Search
CPC .................. H05B 33/0845; G03B 2215/0567; H04N 5/2256; H04N 5/2354
See application file for complete search history.

(56) References Cited

U.S. PATENT DOCUMENTS 5,285,232 A * 2/1994 Taniguchi ............. G03B 15/05
362/12
2004/0032435 A1* 2/2004 Silverbrook ............... B41J 2/01
347/2

(Continued)

FOREIGN PATENT DOCUMENTS

| JP | 2002-258363 | 9/2002 |
|---|---|---|
| JP | 2003-280071 | 10/2003 |

(Continued)

OTHER PUBLICATIONS

Japanese Patent Office, International Search Report for PCT/JP2012/081929 with English translation (Jan. 15, 2013).

*Primary Examiner* — Christopher K Peterson
(74) *Attorney, Agent, or Firm* — Fish & Richardson P.C.

(57) ABSTRACT

An illumination device has LEDs, EDLCs for LED use, and a non-volatile memory for recording the difference between the color temperature and/or the illumination spectrum of LEDs and Xe gas. The unused charge in an EDLC is recovered by a power cell. Illumination strength is changed in accordance with the image pickup distance of a DSC. Illumination strength is changed in accordance with exposure time so that a fill-in ratio is maintained. The illumination strength of LEDs is gradually increased and then at the peak strength is suddenly reduced. The mixture ratio of light from LEDs having different light distributions is changed due to focal distance, and then an incidence angle is changed. A group of LEDs is disposed in a ring shape on the front of a lens. During continuous capture, LEDs are caused to illuminate continuously or synchronously.

19 Claims, 12 Drawing Sheets

(51) Int. Cl.
*H04N 5/225* (2006.01)
*G03B 7/08* (2014.01)
*G03B 15/05* (2006.01)
*G03B 17/18* (2006.01)
*H04N 5/235* (2006.01)

(52) U.S. Cl.
CPC .......... *H04N 5/2256* (2013.01); *H04N 5/2354* (2013.01); *H04N 5/23212* (2013.01); *H04N 5/23241* (2013.01); *H04N 5/23296* (2013.01); *H05B 33/0821* (2013.01); *G03B 17/18* (2013.01); *G03B 2215/0567* (2013.01); *G03B 2215/0575* (2013.01)

(56) References Cited

U.S. PATENT DOCUMENTS

| | | | |
|---|---|---|---|
| 2004/0057715 | A1 | 3/2004 | Tsuchida et al. |
| 2005/0068457 | A1* | 3/2005 | Yamamoto ............ H04M 19/04 348/370 |
| 2005/0135797 | A1 | 6/2005 | Tsuchida et al. |
| 2005/0259983 | A1 | 11/2005 | Tsuchida et al. |
| 2005/0271376 | A1 | 12/2005 | Tsuchida et al. |
| 2006/0093344 | A1* | 5/2006 | Neel .................... G03B 15/05 396/176 |
| 2007/0166023 | A1* | 7/2007 | Murata ................. G03B 15/05 396/159 |
| 2007/0257992 | A1* | 11/2007 | Kato ..................... H04N 9/735 348/223.1 |
| 2008/0175580 | A1 | 7/2008 | Kita |
| 2008/0232079 | A1 | 9/2008 | Awazu |
| 2010/0183289 | A1 | 7/2010 | Homma |
| 2010/0285837 | A1* | 11/2010 | Kalevo ................. G03B 15/03 455/556.1 |
| 2012/0242889 | A1 | 9/2012 | Sumisaki et al. |
| 2013/0002199 | A1* | 1/2013 | Hu ....................... H02J 7/0004 320/112 |

FOREIGN PATENT DOCUMENTS

| | | |
|---|---|---|
| JP | 2004-045863 | 2/2004 |
| JP | 2005-109463 | 4/2005 |
| JP | 2006-018181 | 1/2006 |
| JP | 2007-047192 | 2/2007 |
| JP | 2008-151975 | 7/2008 |
| JP | 2008-235423 | 10/2008 |
| JP | 2010-004691 | 1/2010 |
| JP | 2010-102208 | 5/2010 |
| JP | 2010-122336 | 6/2010 |
| JP | 2010-175596 | 8/2010 |
| JP | 2010-220110 | 9/2010 |
| JP | 2011-158696 | 8/2011 |
| WO | 2006/088039 | 8/2006 |

* cited by examiner

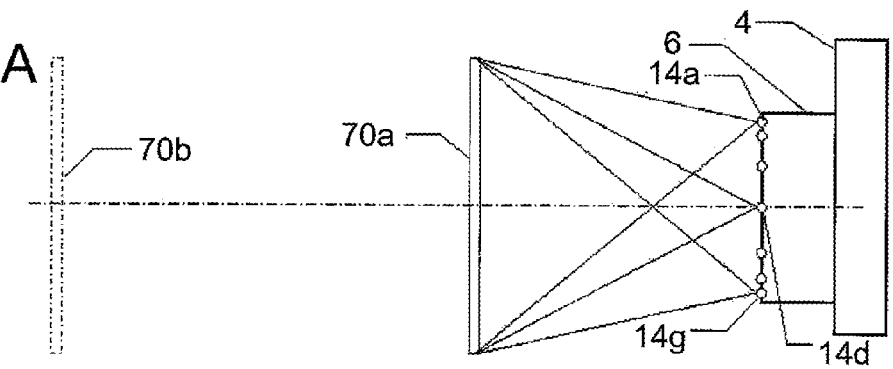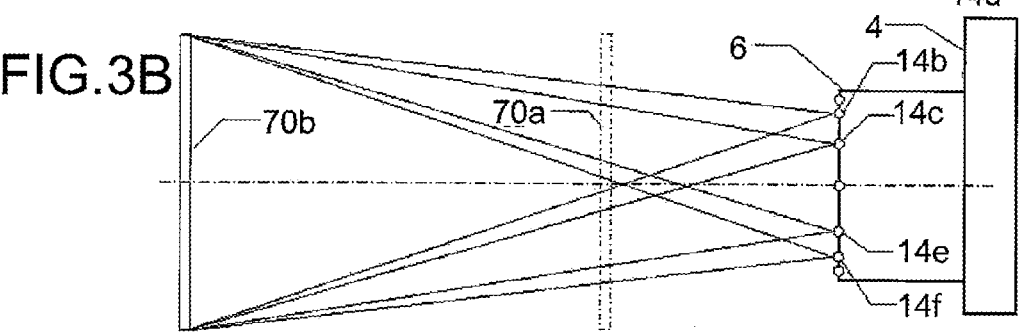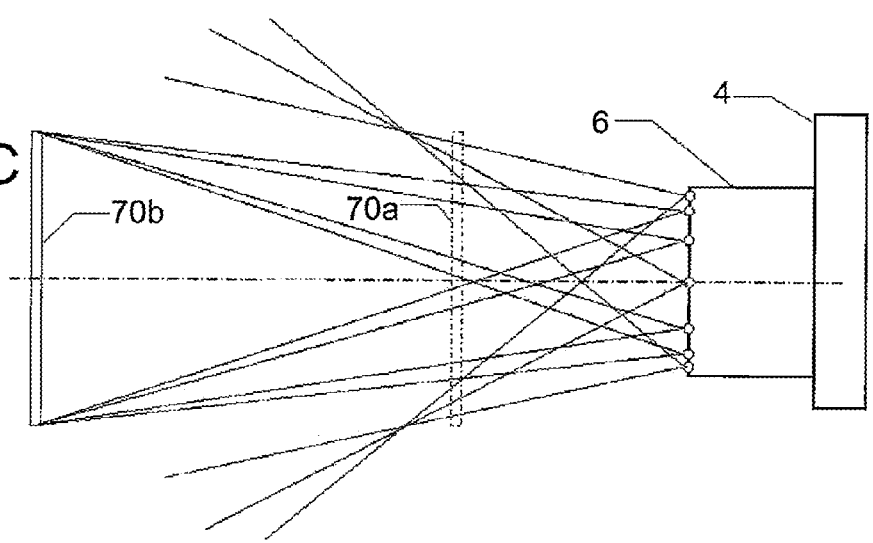

(EXPOSURE PERIOD)

(FLAT ILLUMINATION MODE)

(FLASH ILLUMINATION MODE)

(TRAILING-A-PLUME ILLUMINATION MODE)

t1    t2

(EXPOSURE PERIOD)

(FLAT ILLUMINATION MODE)

t1  t2

(EXPOSURE PERIOD)

(FLAT ILLUMINATION MODE)

t1  t3

(EXPOSURE PERIOD)

(USUAL CONTINUOUS PHOTOGRAPHY MODE)

(SYNCHRONIZATION CONTINUOUS PHOTOGRAPHY MODE)

t1 t2  t4 t5  t6 t7

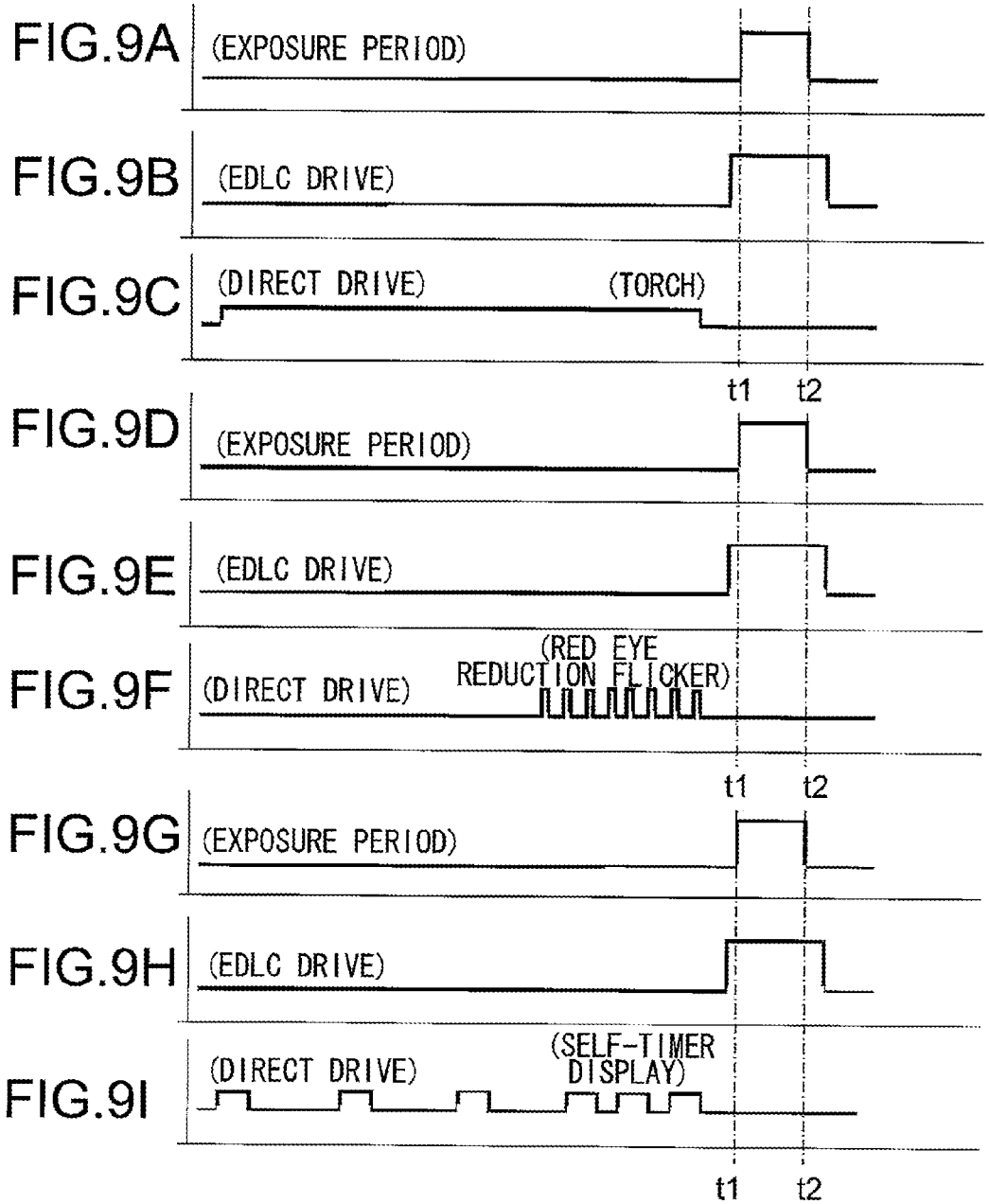

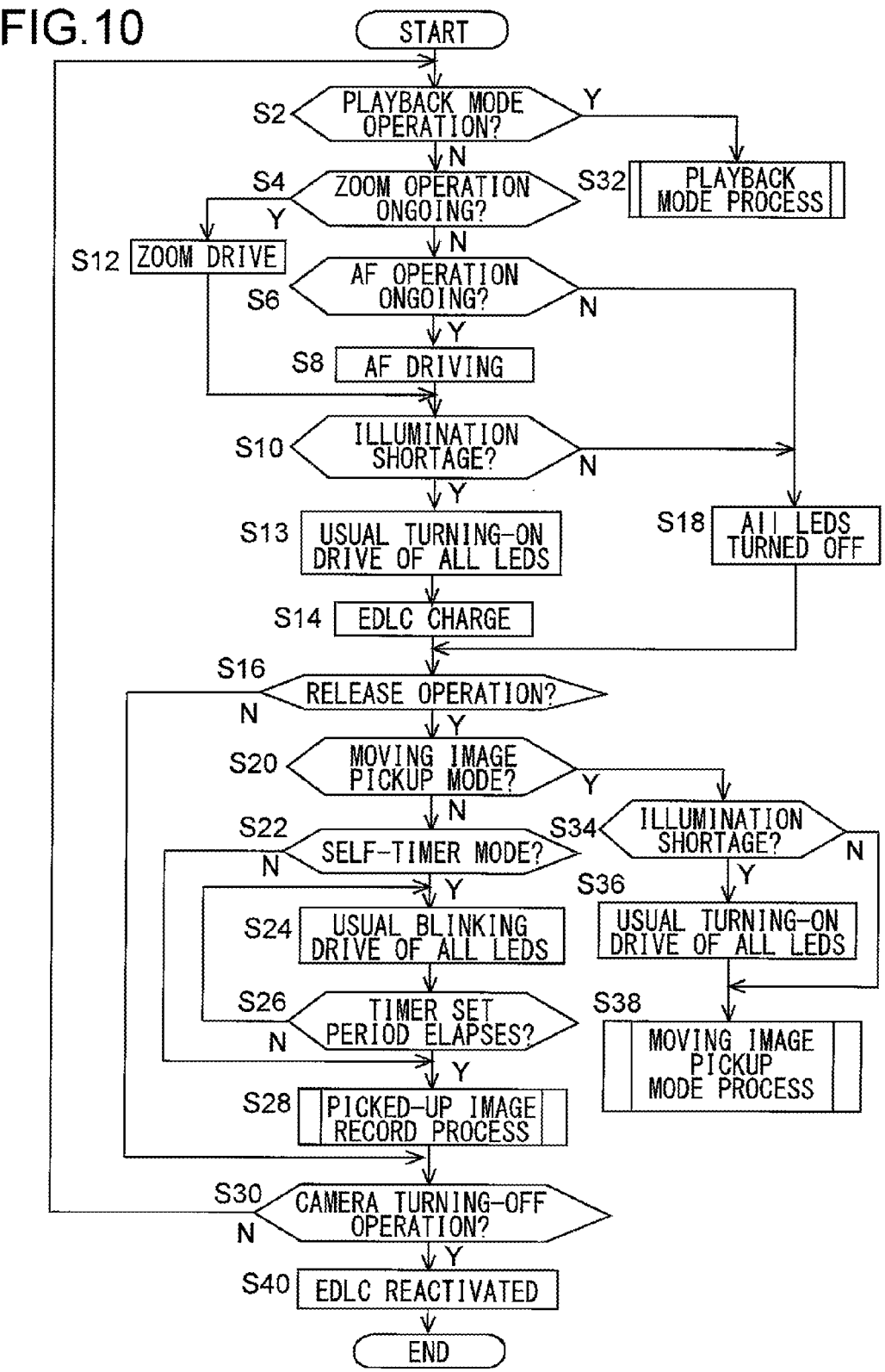

IMAGE PICKUP AUXILIARY LIGHT SOURCE DEVICE AND DIGITAL CAMERA PROVIDED WITH SAME

TECHNICAL FIELD

The present invention relates to an image pickup auxiliary light source device and a digital camera that includes the same.

BACKGROUND ART

Conventionally, various proposals are provided as to using a light emitting diode as an image pickup auxiliary light source and using an electric double-layer capacitor as a capacitor that accumulates electric charges for illumination. For example, an image pickup illumination apparatus is proposed (patent document 1), in which an electric double-layer capacitor is charged by means of an output from a voltage step-up circuit that steps up a power source voltage of a d.c. power source and a voltage, which is obtained by adding a voltage of the electric double-layer capacitor to the voltage of the d.c. power source, is applied to a light emitting diode. Besides, a flash power source apparatus is proposed (patent document 2), in which an electric double-layer capacitor is charged by means of an output current from a first voltage step-up circuit that steps up an input voltage from a power source battery to a predetermined voltage; and an electric current output from a second voltage step-up circuit that steps up the charged voltage is flowed into a light emitting diode to perform flash illumination. Further, a strobe circuit is proposed (patent document 3), which includes: a voltage step-up circuit that steps up a voltage of a battery; a switch circuit that switches an electric current from the battery between a conduction state and an interruption state; an electric double-layer capacitor 5 that charges an electric current from the switch circuit; a voltage monitor circuit that monitors a charge voltage of the electric double-layer capacitor and notifies the switch circuit of interruption at a charge end time; and a constant-current circuit that supplies an electric current from the electric double-layer capacitor to a light emitting diode.

CITATION LIST

Patent Literature

PLT1: JP-A-2002-258363
PLT2: JP-A-2010-4691
PLT3: JP-A-2010-122336

SUMMARY OF INVENTION

Technical Problem

However, there are many problems to be further studied as to an image pickup auxiliary light source device and a digital camera that includes the same.

It is an object of the present invention to provide: an image pickup auxiliary light source device that uses a light emitting diode and an electric double-layer capacitor more effectively; and a digital camera that includes the image pickup auxiliary light source device.

Solution to Problem

To achieve the above object, the present invention provides an image pickup auxiliary light source device that has a light emitting diode, an electric double-layer capacitor that supplies electric power to the light emitting diode, and a non-volatile memory that stores light emission color information of the light emitting diode. According to this, it becomes easy to control a color important for auxiliary light image pickup.

According to a specific feature of the present invention, the non-volatile memory stores the illumination color information of the light emitting diode on a basis of color temperature and emission spectrum of a xenon (Xe) gas. According to a more specific feature, the non-volatile memory stores color information relevant to color temperature and emission spectrum of the light emitting diode on the basis of the color temperature and emission spectrum of the xenon gas. According to a still more specific feature, the non-volatile memory stores color information relevant to deviation of the color temperature and emission spectrum of the light emitting diode from the color temperature and emission spectrum of the xenon gas. According to these features, it is possible to easily perform control of the color of the light emitting diode on the basis of a xenon lamp that is conventionally used as an image pickup auxiliary light source device for a digital camera and has stable color temperature and emission spectrum.

According to another specific feature of the present invention, the image pickup auxiliary light source device has a charge control portion that performs a charge of the electric double-layer capacitor from a rechargeable power source battery, and returns accumulated electric charges from the electric double-layer capacitor to the power source battery. According to this, it is possible to use the electric charges accumulated in the power source battery with no waste.

According to another specific feature of the present invention, the image pickup auxiliary light source device has a pulse width modulation portion that controls power supply performed from the electric double-layer capacitor to the light emitting diode to control a time-dependent change in illumination intensity of the light emitting diode. According to this, it is possible to provide various kinds of image pickup auxiliary light. According to a more specific feature, the pulse width modulation portion keeps the illumination intensity of the light emitting diode at a variable constant intensity. According to this, it is possible to provide image pickup auxiliary light for flash illumination in accordance with an image pickup situation. According to another still more specific feature, the pulse width modulation portion increases gradually the illumination intensity of the light emitting diode and decreases the illumination intensity sharply from a peak thereof. According to this, it is possible to pick up an image within an exposure period in which a subject is illuminated and looks like trailing a plume.

According to another specific feature of the present invention, the electric double-layer capacitor is supplied with electric power from a rechargeable power source battery, and the image pickup auxiliary light source device has a switchover control portion that performs a switchover between power supply from the electric double-layer capacitor to the light emitting diode and power supply from the rechargeable power source battery to the light emitting diode without passing through the electric double-layer capacitor. According to this, diverse uses of the light emitting diode become possible.

According to another specific feature of the present invention, the image pickup auxiliary light source device has a plurality of light emitting diodes, and the plurality of light emitting diodes include light emitting diodes that are different from one another in light distribution. According to this, it is possible to change the light distribution of the image pickup auxiliary light source device by selecting a light emitting diode.

According to another specific feature of the present invention, a digital camera including the image pickup auxiliary light source device describe above is provided. According to a more specific feature, the digital camera has an illumination control portion that makes the light emitting diode emit light continuously over an plurality of exposure periods in continuous photography. According to another more specific feature, the digital camera has an illumination control portion that makes the light emitting diode emit light synchronizing with each of a plurality of exposure periods in continuous photography.

According to another feature of the present invention, a digital camera is provided, which has: a light emitting diode; an electric double-layer capacitor that supplies electric power to the light emitting diode to generate image pickup auxiliary light; and an illumination control portion that keeps an illumination intensity of the light emitting diode at a constant intensity and changes the constant intensity in accordance with an exposure period. According to this, it is possible to provide image pickup auxiliary light for flash illumination in accordance with an image pickup situation.

According to another feature of the present invention, a digital camera is provided, which has: a light emitting diode; an electric double-layer capacitor that supplies electric power to the light emitting diode to generate image pickup auxiliary light; and an illumination control portion that gradually increases illumination intensity of the light emitting diode during an exposure period and sharply decreases the illumination intensity from a peak thereof. According to this, it is possible to pick up an image within an exposure period in which a subject is illuminated and looks like trailing a plume.

According to another feature of the present invention, a digital camera is provided, which has: an image pickup auxiliary light source that includes a plurality of light emitting diodes; an electric double-layer capacitor that supplies electric power to the plurality of light emitting diodes; a zoom lens; and an illumination control portion that changes light distribution of the image pickup auxiliary light source in accordance with a focal distance of the zoom lens. According to this, it becomes possible to perform efficient illumination in accordance with a change in a field angle of the zoom lens.

According to another feature of the present invention, a digital camera is provided, which has: a light emitting diode; an electric double-layer capacitor that supplies electric power to the light emitting diode to generate image pickup auxiliary light; and an illumination control portion that changes an illumination intensity of the light emitting diode in accordance with an image pickup distance. According to this, it becomes possible to perform efficient illumination in accordance with an image pickup distance of the digital camera.

According to another feature of the present invention, a digital camera is provided, which has: an image pickup lens; an electric double-layer capacitor; and a plurality of light emitting diodes that are disposed concentrically around an optical axis of the image pickup lens and are supplied with electric power from the electric double-layer capacitor to generate image pickup auxiliary light. According to this, it is possible to perform illumination, which has no unevenness in shadow and gives a 3D feeling, by using the plurality of light emitting diodes.

According to another feature of the present invention, a digital camera is provided, which has: an electric double-layer capacitor; a plurality of light emitting diodes that are supplied with power from the electric double-layer capacitor to generate image pickup auxiliary light and different from one another in light distribution; and an illumination control portion that supplies power from the electric double-layer capacitor to the light emitting diode to generate image pickup auxiliary light, and supplies power from the power source battery to the light emitting diode without passing through the electric double-layer capacitor to perform flicker illumination for reducing red eye. According to this, it is possible to change the light distribution of the image pickup auxiliary light source device.

According to another feature of the present invention, a digital camera is provided, which has: a light emitting diode; an electric double-layer capacitor that is supplied with electric power from a rechargeable power source battery; and an illumination control portion that supplies electric power from the electric double-layer capacitor to the light emitting diode to generate image pickup auxiliary light, and supplies power from the power source battery to the light emitting diode without passing through the electric double-layer capacitor to perform flicker illumination for reducing red eye. According to this, diverse uses of the light emitting diode become possible.

According to another feature of the present invention, a digital camera is provided, which has: a light emitting diode; an electric double-layer capacitor that is supplied with electric power from a rechargeable power source battery; and an illumination control portion that supplies electric power from the electric double-layer capacitor to the light emitting diode to generate image pickup auxiliary light, and supplies power from the power source battery to the light emitting diode without passing through the electric double-layer capacitor to perform flicker illumination for reducing red eye. According to this, diverse uses of the light emitting diode become possible.

According to another feature of the present invention, a digital camera is provided, which has: an image pickup lens; an electric double-layer capacitor; a light emitting diode that is supplied with electric power to generate image pickup auxiliary light; and a notification portion that notifies the image pickup auxiliary light does not contain an ultraviolet ray. According to this, it is possible to widen an image pickup site that uses the image pickup auxiliary light to an image pickup of a new-born baby and to prevent trouble with the surrounding.

Advantageous Effects of Invention

As described above, according to the present invention, it is possible to provide: an image pickup auxiliary light source device that uses more efficiently a light emitting diode and an electric double-layer capacitor; and a digital camera that includes the image pickup auxiliary light source device.

BRIEF DESCRIPTION OF DRAWINGS

FIG. 3 is a cross-sectional view showing illumination areas of a wide angle LED group and a narrow angle LED group in the example 1.

FIG. 9 is a graph for describing a switchover of power supply passing through an EDLC and power supply without passing through the EDLC in the example 1.

FIG. 10 is a flow chart of operation of a camera control portion in the example 1.

DESCRIPTION OF EMBODIMENTS

Example 1

Figure 1:
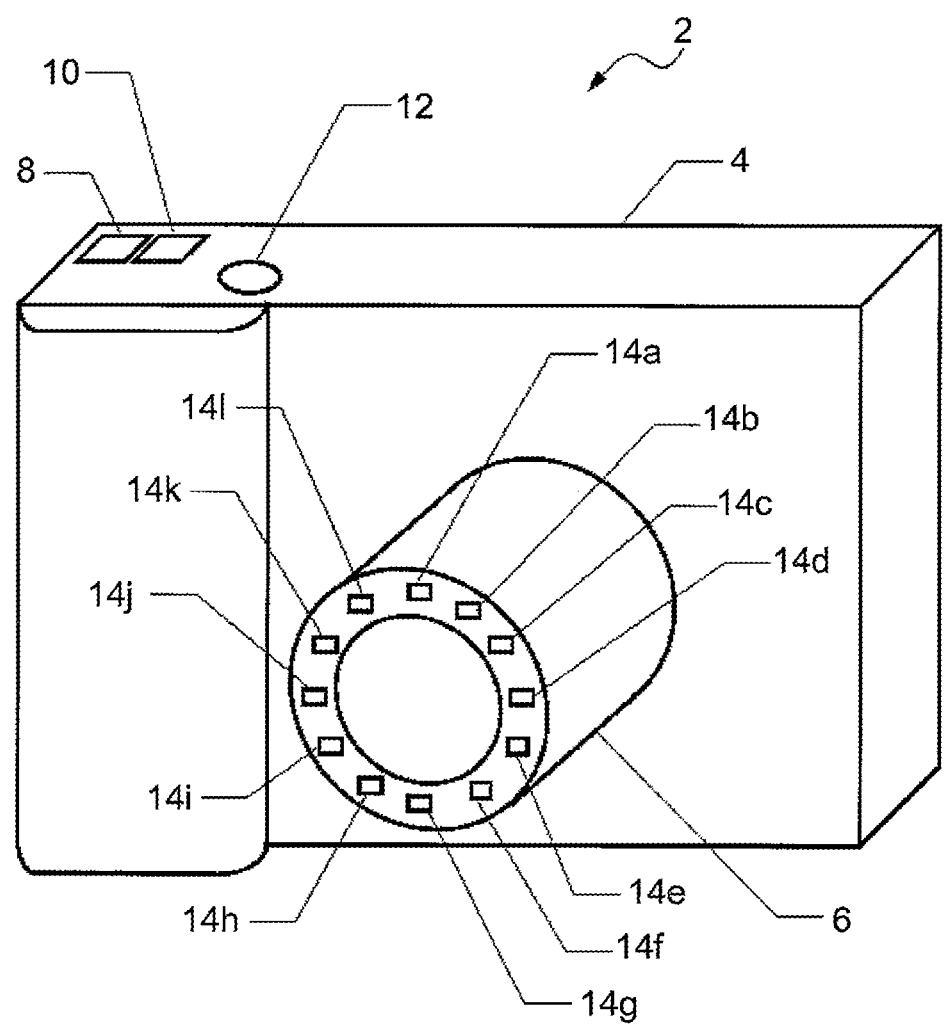
FIG. 1 is a perspective view showing an example 1 of a digital camera according to an embodiment of the present invention (example 1).

FIG. 1 is a perspective view showing the example 1 of a digital camera (DSC) according to an embodiment of the present invention. A digital camera 2 has a camera body 4 and a zoom lens 6 that is inflatable from the camera body 4. When operating the digital camera 2, the zoom lens 6 inflates and shrinks because of operation of zoom up/down buttons 8, 10, so that its focal distance changes. Besides, by half-pushing a release button 12, auto-focusing is started.

On a front surface of the zoom lens 6, light emitting diodes (hereinafter, called "LED") 14a-14l are disposed concentrically around an optical axis of the zoom lens 6 to form an image pickup auxiliary light source device for the digital camera 2. According to such disposition, the LEDs 14a to 14l form a so-called ring flash, and it is possible to perform illumination that has is unevenness in a shadow and gives a 3D feeling. Besides, the image pickup auxiliary light source of the example 1 uses the structure formed of the plurality of LEDs, wherein the LEDs 14a, 14d, 14g, and 14j (hereinafter, called a "wide angle LED group," and the wide angle LED 14a represents) are disposed to have a light distribution that covers a subject located within a field angle when the zoom lens reaches the widest angle; and the LEDs 14b, 14c, 14e, 14f, 14h, 14i, 14k, and 14l (hereinafter, called a "narrow angle LED group," and the narrow angle 14b represents) are disposed such that they have light distributions different from one another to cover a subject located within a field angle when the zoom lens 6 reaches the farthest. And, by controlling these LEDs associating with zooming, it is possible to provide image pickup auxiliary light in accordance with a field angle. As described later, the LEDs 14a to 14l generate the image pickup auxiliary light by means of electric charges accumulated in an electric double-layer capacitor (hereinafter, called an "EDLC"); however, it is also possible to generate the light by driving them without passing through the EDLC.

Besides, during the operation of the zoom up/down buttons 8, 10 and during the auto-focusing by the half push of the release button 12, continuous light is emitted from at least a part of the LEDs 14a to 14l to apply torch illumination to a subject such that it is easy to decide a layout, and auxiliary light for the auto-focusing is provided. Further, when a release is performed by fully pushing the release button 12, the LEDs 14a to 14l or at least a part of the them perform flicker illumination for reducing red eye prior to auxiliary light image pickup. Besides, when the release button 12 is fully pushed in a self-timer mode, the LEDs 14a to 14l or at least a part of them start to blink to notify the subject that a timer is operating. In the meantime, when the release button 12 is fully pushed in an illumination shortage state in a moving image pickup, the continuous light is emitted from the LEDs 14a to 14l to apply the torch illumination to the subject.

Figure 2:
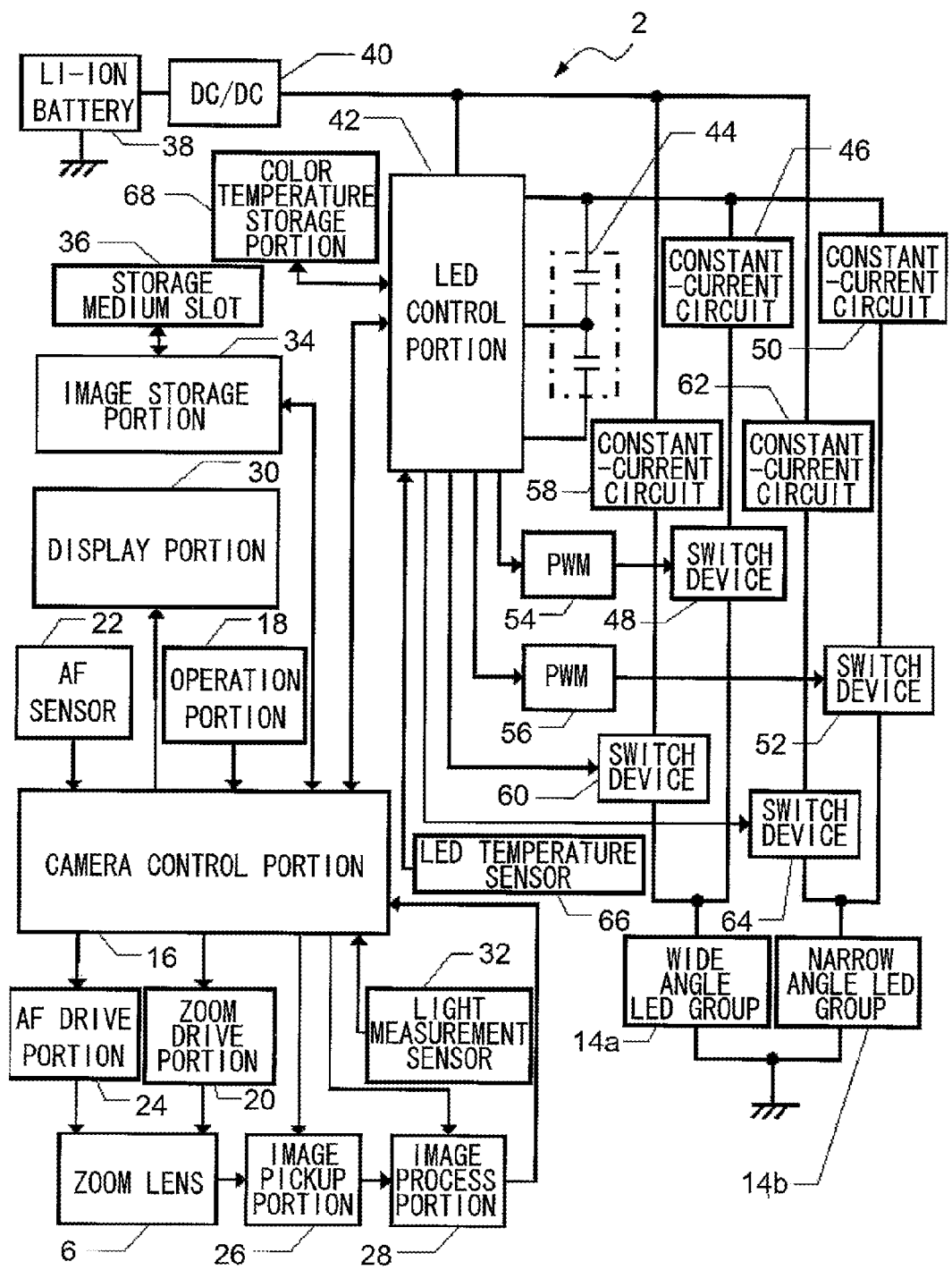
FIG. 2 is a block diagram of the example 1.

FIG. 2 is a block diagram of the example 1 of FIG. 1, and the same numbers are attached to portions corresponding to FIG. 1. In response to operation of the zoom up/down buttons 8, 10 that are a part of an operation portion 18, a camera control portion 16, which controls the entire digital camera 2, controls a zoom drive portion 20 to change the focal distance of the zoom lens 6. Besides, in response to the half push of the release button 12 that is a part of the operation portion 18, the camera control portion 16 detects a distance to the subject by means of an AF sensor 22 and performs focus drive of the zoom lens 6 by means of an AF drive portion 24.

An image pickup portion 26 picks up an image of the subject whose image is formed by the zoom lens 6, and the camera control portion 16 makes a display portion 30 display the subject image obtained via an image process portion 28. It becomes possible to perform a layout adjustment before the image pickup by means of the subject image on the display portion 30. Here, if an illumination shortage is detected by a light measurement sensor 32, as described above, the continuous light is emitted from at least a part of the LEDs 14a to 14l to apply the torch illumination to the subject. In the meantime, it is possible to detect a focus state by means of analysis of contrast of the image processed by the image process portion 28 and to reflect the focus state into the focus drive of the zoom lens 6 by means of the AF drive portion 24; however, as described above, the continuous light emitted from at least a part of the LEDs 14a to 14l becomes auxiliary light for the detection of the auto-focus state. Besides, the analysis of the image processed by the image process portion 28 is also reflected into the above detection of the illumination shortage.

If a release is performed by fully pushing the release button 12, the camera control portion 16 makes the image process portion 28 perform processes such as compression of the image from the image pickup portion 26 and the like and makes the image storage portion 34 store the processed image. The compressed image is transferred to a storage medium slot, into which a memory car or the like is inserted, and stored into the memory card or the like. The compressed image stored in the image storage portion 34 or the memory card is decompressed if a playback mode is selected by operation of the operation portion 18 and played back by the display portion 30. Electric power necessary for the above operation of the digital camera described above is supplied by a power source circuit (not shown) that is connected to a rechargeable lithium ion battery 38.

Next, structures relevant to the generation of the image pickup auxiliary light and the like by means of the LEDs 14a to 14l are described. FIG. 2 shows a part of these structures as a circuit block diagram, and in the figure, lines with no arrows show wiring among circuit blocks. An output from the lithium ion battery 38 is stepped up in voltage by a DC/DC converter 40 and accumulated into the ELDC 44 by an LED control portion 42. The electric charges accumulated in the ELDC 44 are provided to the wide angle LED group 14a via a switch device 48 that is composed of a constant-current circuit 46, an FET and the like, and provided to the narrow angle LED group 14b via a switch device 52 that is composed of a constant-current circuit 50, an FET and the like. The switch device 48 and the switch device 52 are controlled by the LED control portion 42 via pulse width modulators (hereinafter called a "PWM") 54 and 56 respectively, and control independently the turning on/off and illumination states during turned-on periods of the wide angle LED group 14a and narrow angle LED group 14b, thereby enabling illumination in various modes as described later.

The output from the DC/DC converter 40 is further provided directly to the wide angle LED group 14a via a switch device 60 that is composed of a constant-current circuit 58, an FET and the like, and provided directly to the narrow angle LED group 14b via a switch device 64 that is composed of a constant-current circuit 62, an FET and the like. The switch device 60 and the switch device 64 are controlled by the LED control portion 42 and control independently the turning on/off of the wide angle LED control group 14a and narrow angle LED group 14b, thereby enabling illumination in various modes as described later.

The LED control portion 42 detects heat generation states of the wide angle LED group 14a, narrow angle LED group 14b and their peripheral circuits, performs correction of the illumination control, and performs a protection operation during an unusual time.

A color temperature storage portion 68 is composed of a non-volatile memory and the like and stores measured values of color temperature information of the wide angle LED group 14a and narrow angle LED group 14b that are important for photography. The stored color temperature information is sent from the LED control portion 42 to the camera control portion 16 when the LEDs 14a to 14b are built into the digital camera, and reflected into color correction as an image process by the image process portion 28. A xenon lamp is general as the image pickup auxiliary light source device for the digital camera; however, a xenon gas sealed in the xenon lamp has a high color temperature of 6000 K of white light analogous to sunlight and has a wide continuous spectrum that ranges from an ultraviolet region to an infrared region (184 nm to 2000 nm). The color temperature information of the wide angle LED group 14a and narrow angle LED group 14b stored in the color temperature storage portion 68 is stored as information of deviation from the color temperature information of such a xenon lamp that is used as a reference; accordingly, it is easy for the conventional digital camera employing the xenon lamp to handle the information, and it is possible to employ the information stored in the color temperature storage portion 68 as a direct color temperature correction amount.

FIG. 3 is a cross-sectional view showing illumination areas of the wide angle LED group 14a and narrow angle LED group 14b in the example 1 of FIG. 1, and portions corresponding to FIG. 1 are indicated by the same numbers. FIG. 3 (A) shows an illumination area in a case where only the wide angle LEDs 14a, 14d, 14g, and 14j (not shown because 14j lies on 14d to be hidden in the cross section) are turned on, and the light distribution is set to illuminate a short-distance imaginary subject 70a that extends fully to a wide field angle. In the meantime, in FIG. 3 (A), there are many cases where the subject is located at a short distance in auxiliary light image pickup on the wide angle side; accordingly, the illumination area is set on a basis of the short-distance imaginary subject; however, it goes without saying that also a long-distance imaginary subject 70b located in the field angle is illuminated.

FIG. 3 (B) shows an illumination area in a case where only the narrow angle LEDs 14b, 14c, 14e, 14f, 14h, 14i, 14k, and 14l (because 14h, 14i, 14k, and 14l respectively lie on 14b, 14c, 14e, and 14f to be hidden in the cross section, they are not shown) are turned on, and the light distribution is set to illuminate the long-distance imaginary subject 70b that extends fully to a field angle at a tele-end. In the meantime, in FIG. 3 (B), there are many cases where the subject is located at a relatively long distance in auxiliary light image pickup on the tele-side; accordingly, the illumination area is set on a basis of the long-distance imaginary subject; however, it goes without saying that also the short-distance imaginary subject 70b located in the field angle is illuminated. In this way, in the image pickup on the tele-side, the illumination by the LEDs is narrowed and distributed such that the light reaches a far position in a narrow field angle. Besides, in the example 1, to perform the illumination for the subject imagined at the far distance, the narrow angle LEDs outnumber the wide angle LEDs.

In contrast to the above description, FIG. 3 (C) shows an illumination area in a case where all of the wide angle LED group and narrow angle LED group are made to perform the illumination at the tele-end. To avoid complicatedness, the same individual LEDs as FIG. 3 (A) and FIG. 3 (B) are not indicated by the numbers; however, in the state of FIG. 3 (C), also the wide angle LED group contributes to the illumination of the long-distance imaginary subject 70b, and absolute illumination increases. However, the light distribution diverges; accordingly, illumination efficiency deteriorates compared with the case where only the narrow angle LED group is made to perform the illumination shown in FIG. 3 (B). In the meantime, in the state of FIG. 3 (C), in a case where there is an object at a short distance outside the tele-end field angle, reflected light from the object reaches the long-distance imaginary subject 70b in the field angle; accordingly, a so-called bounce photography state is obtained, which is not necessarily a waste. In the meantime, in FIG. 3 (C), the light distribution for a central portion becomes larger; however, both the wide angle LED group and the narrow angle LED group contribute to the illumination of the short-distance imaginary subject 70a. Although not shown, an illumination situation in a case, where all of the wide angle LED group and narrow angle LED group are made to perform the illumination at the wide angle end as shown in FIG. 3 (A), is understandable based on a relationship between FIG. 3 (B) and FIG. 3 (C). As described above, by constituting the light source of the image pickup auxiliary light source device with the plurality of LEDs and mingling the LEDs different from one another in the light distribution, it becomes possible to perform suitable different illumination for various purposes.

Figure 4A:
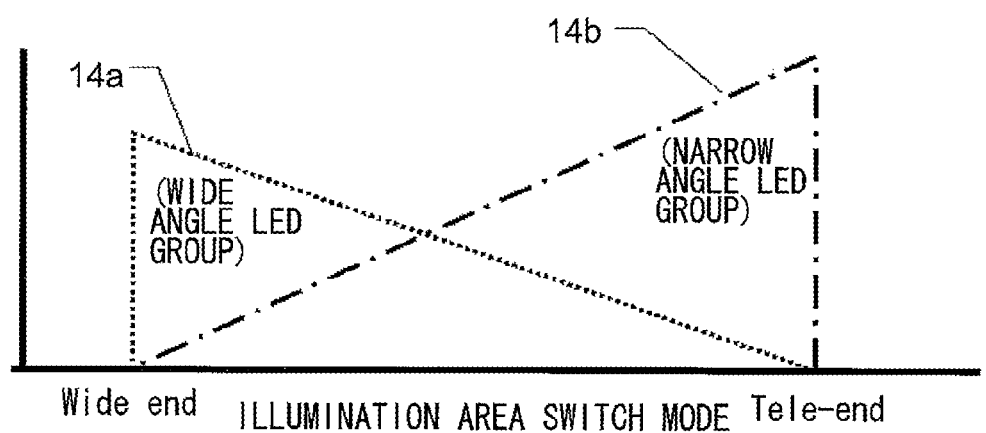
FIG. 4 is a graph for describing an illumination switchover between a wide angle LED group and a narrow angle LED group in the example 1.
Figure 4B:
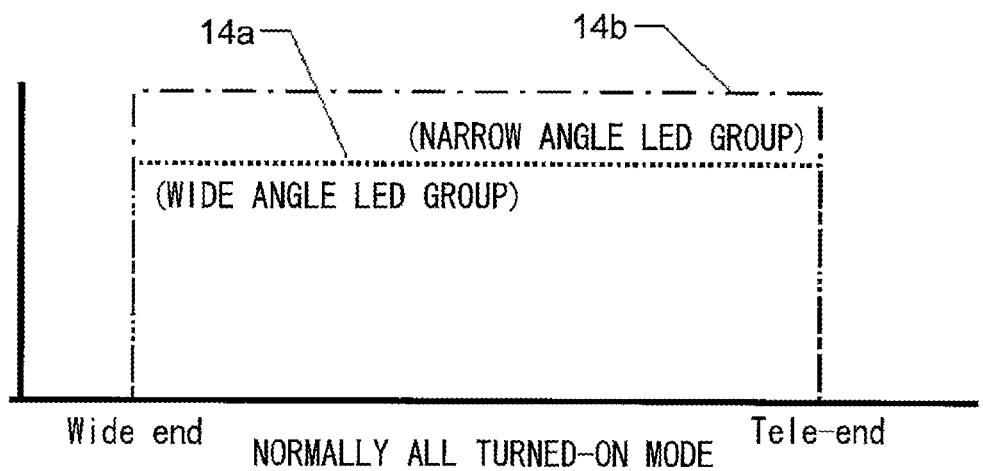

FIG. 4 is a graph for describing an illumination switchover between the wide angle LED group 14a and the narrow angle LED group 14b in the example 1 of FIG. 1, in which a lateral axis indicates the focal distance of the zoom lens 6, while a vertical axis indicates the illumination intensity. In the meantime, the illumination intensity is achieved by changing duties of the PWMs 54 and 56 in FIG. 2 in accordance with the focal distance of the zoom lens 6. FIG. 4 (A) shows an illumination switchover mode, that is, a case where the intensities of the wide angle LED group 14a and narrow angle LED group 14b are gradually changed in accordance with the zooming. In FIG. 4 (A), the illumination intensity of the wide angle LED group 14a shown by a broken line 14a becomes maximum at the wide angle end (which corresponds to the state of FIG. 3 (A)) and minimum at the tele-end. On the other hand, the illumination intensity of the narrow angle LED group 14b shown by a one-dot-one-bar line 14b in FIG. 4 (A) becomes minimum at the wide angle end and maximum at the tele-end (which corresponds to the state of FIG. 3 (B)). As already described, because of the larger number of LEDs, the maximum illumination intensity of the narrow LED group 14b is larger than the illumination intensity of the wide angle LED group 14a. As apparent from FIG. 4 (A), a mixing ratio of the illumination light by the wide angle LED group 14a and the illumination light by the narrow angle LED group 14b changes gradually in accordance with the zooming, and it becomes possible to perform efficient illumination in accordance with a field angle.

On the other hand, FIG. 4 (B) shows a normally all turned-on mode, in which the mixing ratio of the illumination light by the wide angle LED group 14a and the illumination light by the narrow angle LED group 14b is not changed irrespective of the focal distance. This is a mode in which the state where all of the wide angle LED group 14a and narrow angle LED group 14b are made to perform the illumination irrespective of the zooming as shown in FIG. 3 (C) is kept while the zooming is performed at the same time.

Figure 5:
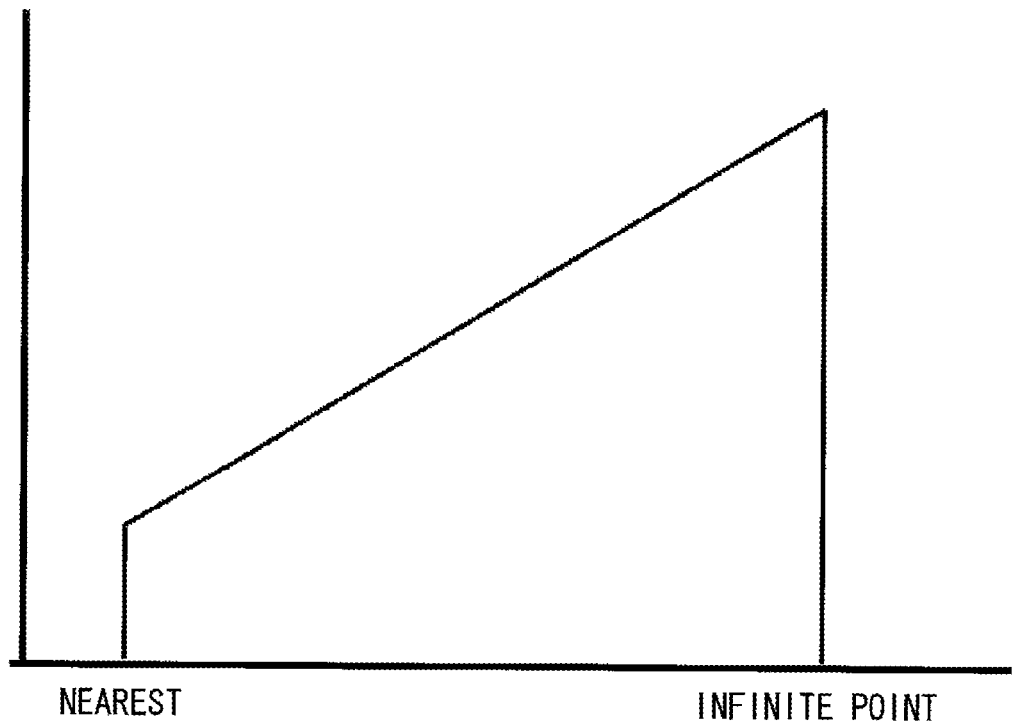
FIG. 5 is a graph for describing a whole intensity change of a wide angle LED group and a narrow angle LED group for a distance in the example 1.
Figure 6A:
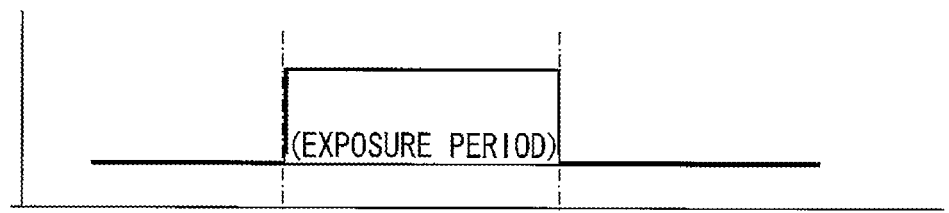
FIG. 6 is a graph for describing various illumination modes in the example 1.
Figure 6B:
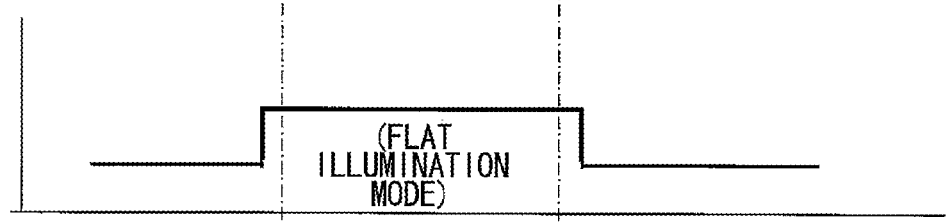
Figure 6C:
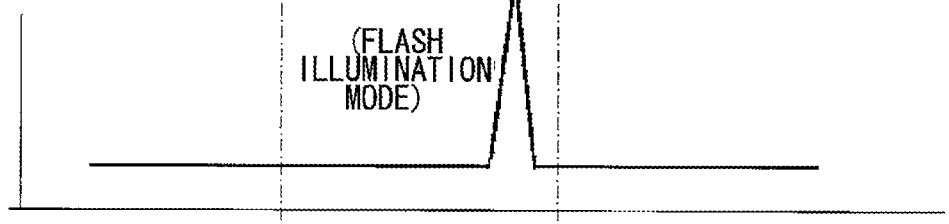
Figure 6D:
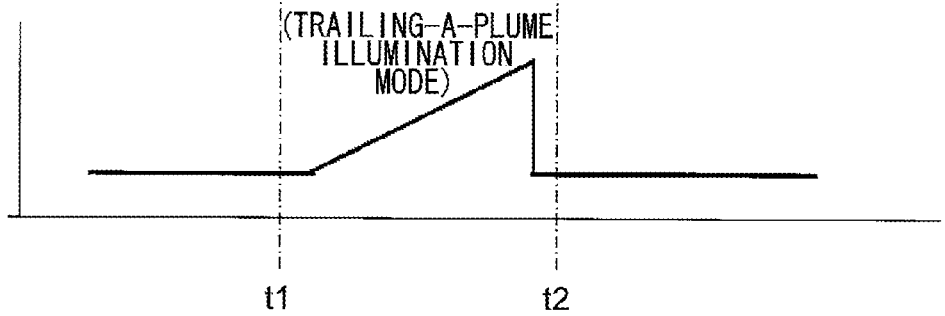
Figure 7A:
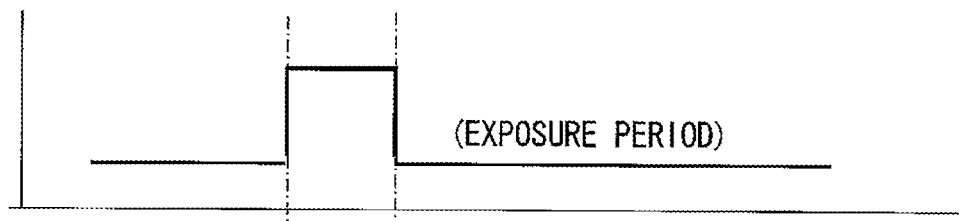
FIG. 7 is a graph for describing a case where a fill-in flash image pickup is performed in the example 1.
Figure 7B:
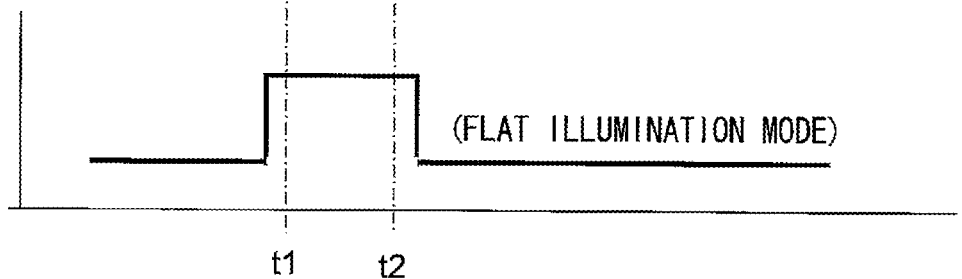
Figure 7C:
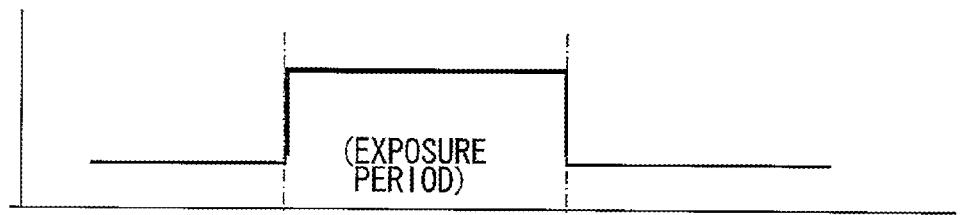
Figure 7D:
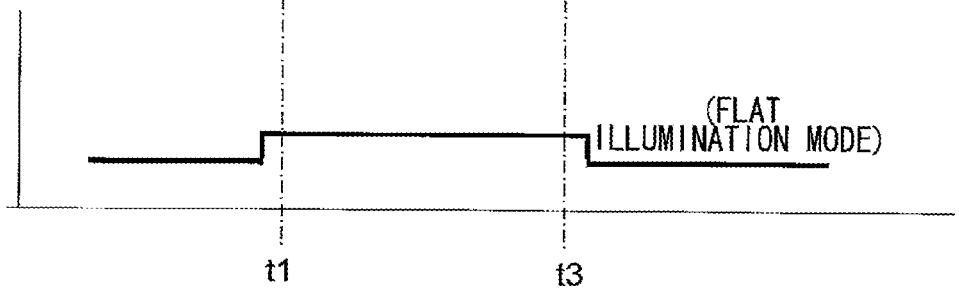

FIG. 5 is a graph for describing a whole intensity change of the wide angle LED group 14a and narrow angle LED group 14b for the distance in the example 1 of FIG. 1, in which the lateral axis indicates the focus distance of the zoom lens 6, while the vertical axis indicates the average illumination intensity of the wide angle LED group 14a and narrow angle LED group 14b. In the meantime, also the illumination intensity change in this case is achieved by changing the duties of the PWMs 54 and 56 in FIG. 2 in accordance with the focus distance of the zoom lens 6. Specifically, the duties are changed in accordance with information of a distance to a subject that is detected during the auto-focusing. According to this, it is possible to prevent an image from being subjected to over-exposure caused by excessive illumination during especially a short-distance image pickup time.

FIG. 6 is a graph for describing various illumination modes in the example 1 of FIG. 1. In FIG. 6 (A), the lateral axis indicates the time, while the vertical axis indicates the exposure state change. Specifically, it is shown that exposure is performed between t1 and t2. On the other hand, in FIG. 6 (B) to FIG. 6 (D), the lateral axis indicates the time corresponding to FIG. 6 (A), while the vertical axis indicates the average illumination intensity of the wide angle LED group 14a and narrow angle LED group 14b. FIG. 6 (B) shows a flat illumination mode, in which flat illumination having substantially no intensity change is performed during a time zone including an exposure period. This mode is intended to perform an image pickup in which a suitable shake occurs in a moving subject despite the auxiliary light image pickup, and is suitable for image pickups of a situation in which reek is meandering up and the like.

In contrast to this, FIG. 6 (C) shows a flash illumination mode, which corresponds to the conventional flash image pickup using a xenon lamp and is suitable for an image pickup of an unmoving subject. The illumination peak is set at a timing shortly before the end of the exposure period, and in a case where there is a moving subject, the last state looks bright to produce an effect in which the movement looking dark so far because of environmental light looks like trailing a plume. In the meantime, the instant illumination intensity of the LED is smaller than a xenon lamp; accordingly, a total light amount is likely to run short in short-time illumination.

To increase the light amount, it is sufficient to increase the number of LEDs; however, in a case where it is impossible to dispose an enough number of LEDs to secure the necessary light amount, a gain of the image pickup portion 26 is enlarged in this mode.

Besides, FIG. 6 (D) shows a trailing-a-plume illumination mode, in which the illumination intensity gradually increases after the start of the exposure period; and because the illumination peak is set at a timing shortly before the end of the exposure period, an illumination situation is provided, in which the intensity sharply declines after reaching the peak. This is suitable for producing an effect by means of only the illumination light in which when there is a moving subject, an earlier state within the exposure period looks darker and the last state looks brightest; and for example a ball movement trails a plume within the exposure period.

FIG. 7 is a graph for describing an illumination mode in a case where the auxiliary light is added to the environmental light to perform a fill-in flash image pickup. In FIG. 7 (A), the lateral axis indicates the time, while the vertical axis indicates that the exposure is performed between t1 and t2 like in FIG. 6 (A). On the other hand, like in FIG. 6 (B), in FIG. 7 (B), the lateral axis indicates the time, while the vertical axis indicates the average illumination intensity of the wide angle LED group 14a and narrow angle LED group 14b. FIG. 7 (C) and FIG. 7 (D) are understandable based on FIG. 7 (A) and FIG. 7 (B), respectively; however, as shown in FIG. 7 (C), the exposure period extends between t1 and t3. This is because the subject is dark, and to deal with this, in FIG. 7 (D), the average illumination intensity of the wide angle LED group 14a and narrow angle LED group 14b is made small and a percentage of the auxiliary light added to the environmental light is the same as the case of FIG. 7 (B). Also such an illumination intensity change is achieved by changing the duties of the PWMs 54 and 56 in FIG. 2 in accordance with an output from the light measurement sensor 32.

Figure 8A:
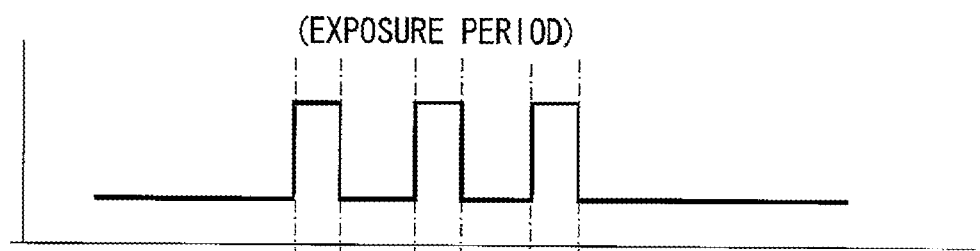
FIG. 8 is a graph for describing various illumination modes in continuous photography in the example 1.
Figure 8B:
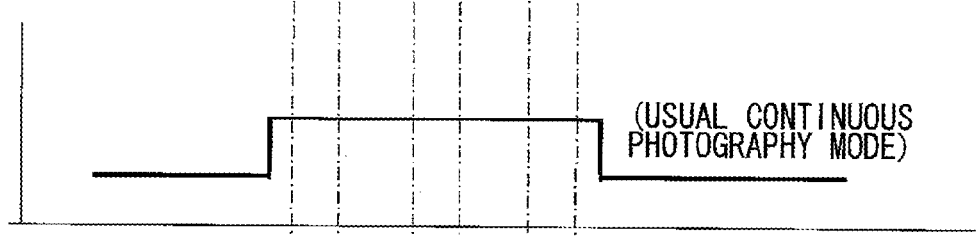
Figure 8C:
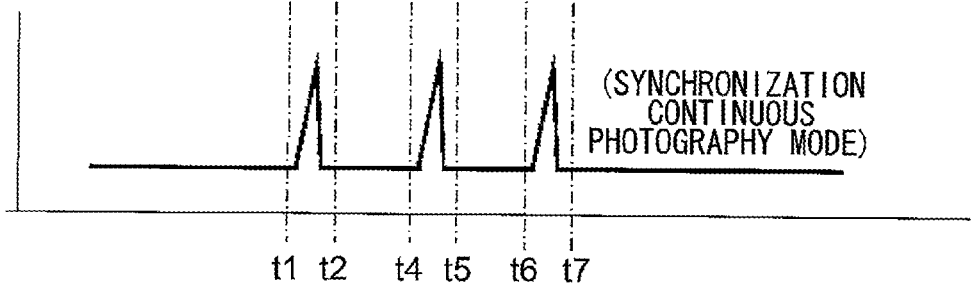

FIG. 8 is a graph for describing various illumination modes during a continuous photography time in the example 1 of FIG. 1. In FIG. 8 (A), the lateral axis indicates the time, while the vertical axis indicates that the exposure is performed between t1 and t2 like in FIG. 6 (A). In the meantime, FIG. 8 shows a continuous photography mode; accordingly, as shown in FIG. 8 (A), second and third exposure periods continually appear between t4 and t5, and between t6 and t7, respectively. In FIG. 8 (B) and FIG. 8 (C), the lateral axis indicates the time corresponding to FIG. 8 (A), while the vertical axis indicates the average illumination intensity of the wide angle LED group 14a and narrow angle LED group 14b.

FIG. 8 (B) shows a usual continuous photography mode, in which flat illumination having substantially no intensity change is performed during a time zone including a plurality of exposure periods during which continuous photography is performed. Such illumination is suitable for continuous photography for picking up a moving image and the like. In the meantime, in the usual continuous photography mode of FIG. 8 (B), the flat illumination is continuous; however, it is not always necessary to continue the illumination between the continuous photography periods. For example, in a case where a length between the continuous photography periods is relatively long, it is also possible to employ a structure, which repeats control in which the illumination is temporarily halted every time each exposure period ends and the flash illumination is resumed shortly before the next exposure period to preserve electric charges in the EDLC.

On the other hand, FIG. 8 (C) shows a synchronous continuous photography mode, in which the flash illumination is performed in synchronization with each exposure period. In such illumination, the light amount becomes small; however, it is possible to stop a moving subject in each continuous photography; accordingly, it is possible to obtain image information that has only a slight shake component during each exposure period, which is suitable for a case where images as continuous photography results are combined and a shake occurring between the continuous photography is corrected by means of an image process and the like.

In all of the above control of LEDs shown in FIG. 4 to FIG. 8, the illumination using the electric charges accumulated in the EDLC 44 of FIG. 2 is performed; however, for the LED illumination, it is possible to supply electric power not only through this route but also, as described above, directly through the route that extends from the DC/DC converter 40 of FIG. 2 to the wide angle LED group 14a via the constant current circuit 58 and switch device 60 and the route that extends from the DC/DC converter 40 to the narrow angle LED group 14b via the constant current circuit 62 and switch device 64.

FIG. 9 is a graph for describing a switchover of the power supply passing through the EDLC 44 in the above example 1 of FIG. 1 and the direct power supply without passing through the EDLC 44 in the example 1. In FIG. 9 (A), FIG. 9 (D), and FIG. 9 (G), the lateral axis indicates the time, while the vertical axis indicates that the exposure is performed between t1 and t2 and the like as in FIG. 6 (A). These figures are the same as one another; however, they are represented to describe three cases where electric power is supplied directly. Also in FIGS. 9 (B), 9 (E), and 9 (H), the lateral axis indicates the time, while the vertical axis indicates, like FIG. 6 (B), the average illumination intensity of the wide angle LED group 14a and narrow angle LED group 14a and a state in which the flat illumination is performed. Also FIGS. 9 (B), 9 (E), and 9 (H) are the same as one another; however, they are represented to describe three cases where power is supplied directly like in FIGS. 9 (A), 9 (D), and 9 (G).

In the meantime, FIG. 9 (C) shows behavior in which the torch illumination is performed by means of direct power supply before the illumination is performed via the EDLC 44 during the exposure period as shown in FIG. 9 (A) and FIG. 9 (B). As already described, the torch illumination is useful to decide a layout during the auto-focusing performed by half-pushing the release button 12 during the operation of the zoom up/down buttons 8, 10 and to provide the auxiliary light for the auto-focusing.

Next, FIG. 9 (F) shows behavior in which the flicker illumination for sharply shrinking pupils is performed to reduce red eye before the illumination is performed via the EDLC 44 during the exposure period as shown in FIG. 9 (D) and FIG. 9 (E). It is possible to perform such flicker illumination by controlling the switch devices 60 and 64 by means of the LED control portion 42 of FIG. 2.

Further, FIG. 9 (I) shows behavior in which the LED is blinked to notify that the self-timer is operating before the illumination is performed via the EDLC 44 during the exposure period as shown in FIG. 9 (G) and FIG. 9 (H). It is also possible to perform such blink illumination by controlling the switch devices 60 and 64 by means of the LED control portion 42 of FIG. 2.

In the meantime, the various kinds of direct illumination shown in FIGS. 9 (C), 9 (F), and 9 (I) may not be performed separately from one another, but may be suitably combined with one another. For example, during a period of using the self-timer, first the notification display during the timer operation may be performed as shown in FIG. 9 (I), then a switchover may be performed to fulfill the red-eye reduction flicker illumination shortly before the exposure as shown in FIG. 9 (F). Besides, to decide a layout and the like, first the torch illumination as shown in FIG. 9 (C) may be performed, then the switchover may be performed to fulfill the red-eye reduction flicker illumination shortly before the exposure as shown in FIG. 9 (F). Further, the direct power supply performed without passing through the EDLC 44 is not limited to the case where it is combined with the power supply via the EDLC 44 and used as shown in FIG. 9, but is usable alone. For example, the torch illumination of FIG. 9 (C) is usable alone in the moving image pickup that does not need the flash illumination. Further, the blink illumination for the self-timer display as shown in FIG. 9 (I) is usable alone under a bright environmental light that does not need the image pickup auxiliary light.

FIG. 10 is a flow chart of operation of the camera control portion 16 in the example 1 of FIG. 1 and FIG. 2. If a main switch of the camera is turned on by the operation portion 18, the flow starts, and in a step S2, checks whether the digital camera 2 is set to a playback mode by GUI of the operation portion 18 and display portion 30 or not. If the playback mode setting is not detected, it is an image pickup mode; accordingly, the flow goes to a step S4 to check whether a zoom operation is ongoing or not. If a zoom operation is not ongoing, the flow checks in a step S6 whether an AF operation is ongoing or not; if an AF operation is ongoing, the flow goes to a step S8 to perform the AF drive and goes to a step S10.

On the other hand, if it is detected in the step S4 that a zoom operation is ongoing, the flow goes to a step S12 to perform the zoom drive and goes to the step S10. In the step S10, the flow checks whether an illumination shortage is detected by the light measurement sensor and the like or not; if it is an illumination shortage, the flow goes to a step S13 to issue an instruction for performing a usual illumination drive of all the LEDs to start the torch illumination. If the torch illumination is already ongoing, the torch illumination is continued. This corresponds to the drive of FIG. 9 (C). In the meantime, the term "usual" of the usual illumination drive in the flow in and after FIG. 10 means a direct drive that does not pass through the EDLC. Then, in a step S14, the flow issues an instruction for performing a charge of the EDLC and goes to a step S16 to prepare for the illumination by the image pickup auxiliary light.

On the other hand, if an AF drive is not ongoing in the step S6, the flow judges that a layout decision and the like are not performed and goes to a step S18 to turn off all the LEDs, then goes to the step S16. If the LED is not in the on-state, the flow performs nothing and goes to the step S16. In the step S16, the flow checks whether a release operation is performed by fully pushing the release button or not and goes to a step S20. In the step S20, the flow checks whether it is a moving image pickup mode or not, and if it is No, the flow goes to a step S22 to check whether the self-timer mode is set or not. And, if it is the self-timer mode, in a step S24, the flow applies the usual blink drive to all the LEDs and goes to a step S26. If the blink drive is already ongoing, the blink drive is continued. This corresponds to the drive of FIG. 9 (I). In the step S26, the flow checks whether a timer set period elapses or not, and if the timer set period has not elapsed yet, the flow returns to the step S24, and repeats the step S24 and the step S26 until the timer set period elapses to continue the usual blink drive of the LEDs. On the other hand, if it is detected in the step S26 that the timer set period elapses, the flow goes to a picked-up image record process of a step S28. Besides, if it is detected in the step S22 that it is not the self-timer mode, the flow directly goes to the picked-up image record process of the step S28. Details of the picked-up mage record process are described later.

If the picked-up image record process of the step S28 is completed, the flow goes to a step S30 to check whether an operation of turning off the main switch of the camera is performed on the operation portion 18. And if the camera turning-off operation is not detected, the flow returns to the step S2, thereafter repeats the step S2 to the step S30 unless a playback mode operation is detected in the step S2 or a release operation is detected in the step S30. This repetition is performed at an amply high speed. Accordingly, it is possible to change the processes based on a change in operation and situation by quickly responding to changes in the detection results in the step S4, step 6, step 10, step 16, and step 22.

In the meantime, in the step S2, when a playback mode setting operation is detected by means of the GUI of the operation portion 18 and display portion 30, the flow goes to a layback mode process of a step S32. And, when the image pickup mode is selected by a function of the playback mode process, the flow returns to the step S4. Besides, when a camera turning-off operation is detected by a function of the playback mode process, the flow is terminated.

Besides, in the step S20, when the setting of a moving image pickup mode is detected by the GUI of the operation portion 18 and display portion 30, the flow goes to a step S34 to check whether it is an illumination shortage or not. And if it is an illumination shortage, the flow issues an instruction for performing the usual illumination drive of all the LEDs in a step S36 to start the torch illumination and goes to the moving image pickup mode of a step S38. On the other hand, when an illumination shortage is not detected in the step S34, the flow directly goes to the step S38. The torch illumination instructed in the step S36 corresponds to the drive of FIG. 9 (C). And, when the image pickup mode is selected by a function of the moving image pickup mode process, the flow returns to the step S4. Besides, when a camera turning-off operation is detected by the function of the moving image pickup mode process, the flow is terminated.

On the other hand, when a camera turning-off operation is detected by the operation portion 18 in the step S30, the flow goes to a step S40. In the step S40, if the electric charges accumulated in the EDLC 44 remain unused or with a part of them used, they are reactivated and returned to the lithium ion battery of FIG. 2, and the flow is terminated.

Figure 11:
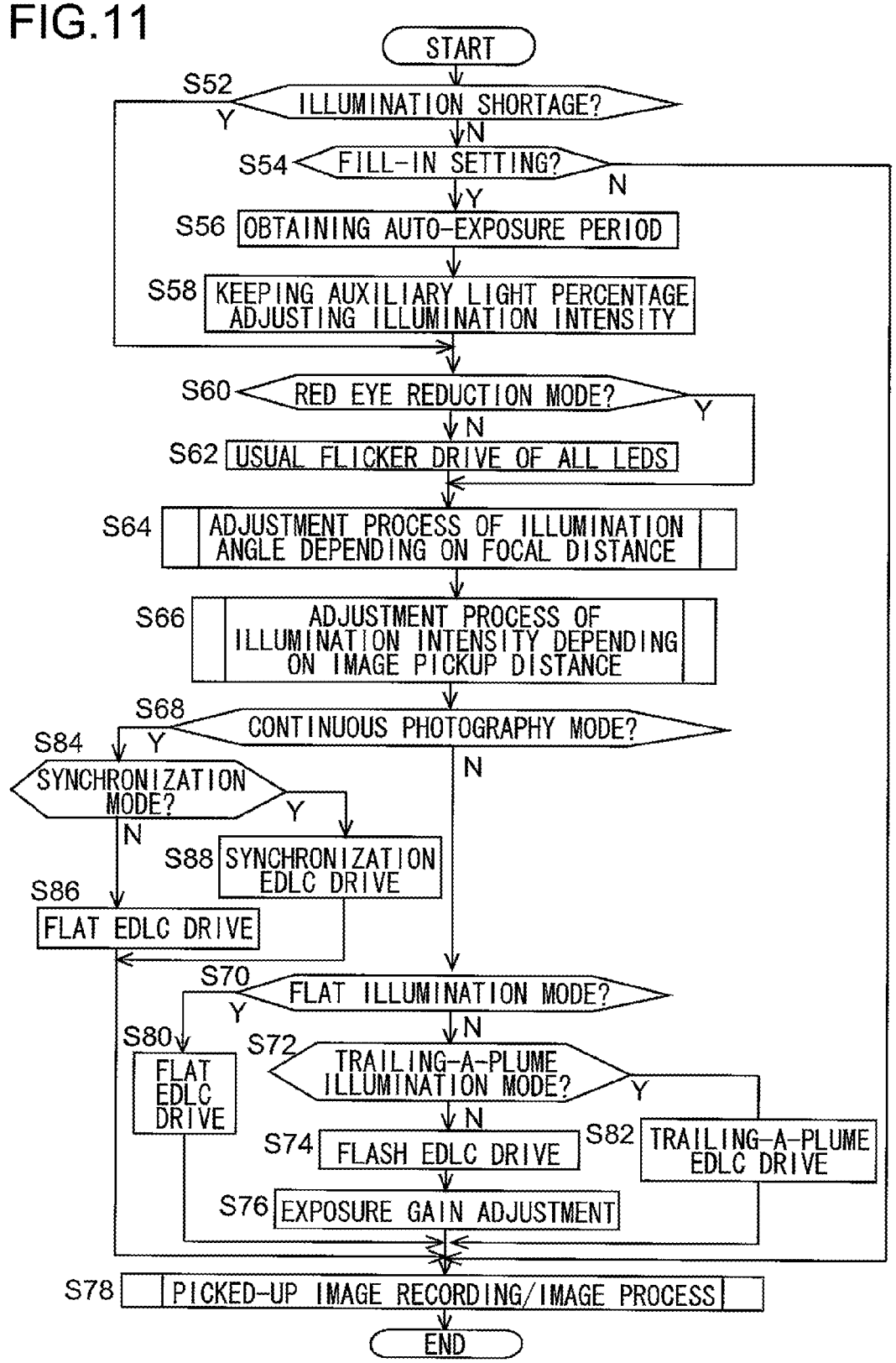
FIG. 11 is a flow chart showing details of a picked-up image record process of FIG. 10.

FIG. 11 is a flow chart showing details of the picked-up image record process of FIG. 10. When the flow starts, it is checked in a step S52 whether it is an illumination shortage or not. If it is not an illumination shortage, the flow goes to a step S54 to check whether a fill-in auxiliary light image pickup mode is set by the GUI of the operation portion 18 and display portion 30 or not. If it is a fill-in setting, the flow goes to a step S56 to obtain data of the exposure period automatically decided by the illumination sensor and the like in the image pickup. And the flow adjusts the illumination intensity of the LED such that a percentage of the auxiliary light added to the environmental light in a step S58 is kept, and goes to a step S60. The operations in the step S56 and step S58 correspond to the functions described in FIG. 7. On the other hand, when an illumination shortage is detected in the step S52, the flow directly goes to the step S60.

In the step S60, the flow checks whether the red eye reduction mode is set by the GUI of the operation portion 18 and display portion 30 or not. If it is Yes, usual flicker illumination is applied to the LED for red eye reduction in a step S62. This corresponds to the function of FIG. 9 (F). And if the flicker illumination in the step S62 is terminated, the flow goes to a step S64. On the other hand, if it is ascertained that the red eye reduction mode is not set in the step SU, the flow directly goes to the step S64. In the step S64, an illumination angle adjustment process depending on a focal distance is performed. This corresponds to the functions described in FIG. 3 (A), FIG. 3 (B), and FIG. 4 (A). Further, in a step S66, an illumination intensity adjustment process depending on an image pickup distance is performed. This corresponds to the function described in FIG. 5.

If the above processes are terminated, the flow goes to a step S68 to check whether the continuous photography mode is set by the GUI or not. If the setting of the continuous photography mode is not detected, the flow goes to a step S70 to check whether the flat illumination mode is set by the GUI or not. If it is No, the flow checks whether the trailing-a-plume illumination mode is set by the GUI or not. If it is also N, it is meant that the flash illumination mode is set; accordingly, the flow goes to a step S74 to perform the exposure and the flash illumination via the EDLC. And, the flow goes to a step S76, performs an exposure gain adjustment to compensate for the illumination amount shortage, and goes to a step S78. This corresponds to the function described in connection with FIG. 6 (A) and FIG. 6 (C).

On the other hand, when it is ascertained in the step S70 that the flash illumination mode is set, the flow goes to a step S80 to perform the flat illumination via the EDLC and the exposure during the illumination, and goes to the step S78. This corresponds to the functions described in FIG. 6 (A) and FIG. 6 (B). Further, when it is ascertained in the step S72 that the trailing-a-plume illumination mode is set, the flow goes to a step S82 to perform the exposure and the trailing-a-plume illumination via the EDLC, and goes to the step S78. This corresponds to the functions described in FIG. 6 (A) and FIG. 6 (D). In the meantime, when the fill-in setting is not detected in the step S54, it means the image pickup that does not use the auxiliary light; accordingly, the flow directly goes to the step S78.

Besides, when it is ascertained in the step S68 that the continuous photography mode is set, the flow goes to a step S84 to check whether the synchronization photography mode is set or not. And if it is not the synchronization mode, the flow goes to a step S86 to issue an instruction for the flat illumination via the EDLC between the continuous photography exposures, and goes to the step S78. This corresponds to the functions described in FIG. 8 (A) and FIG. 8 (B). On the other hand, when it is ascertained in the step S84 that the synchronization mode is set, the flow goes to a step S88 to issue an instruction for the illumination that synchronizes with each exposure period during which the continuous photography is ongoing via the EDLC, and goes to the step S78. This corresponds to the functions described in FIG. 8 (A) and FIG. 8 (C).

In the step S78, the recording of the image detected by the image pickup portion 26 during the exposure period and an image process by the image process portion 28 are performed. In this way, the flow of FIG. 11 is terminated, and the flow goes to the step S30.

Example 2

Figure 12:
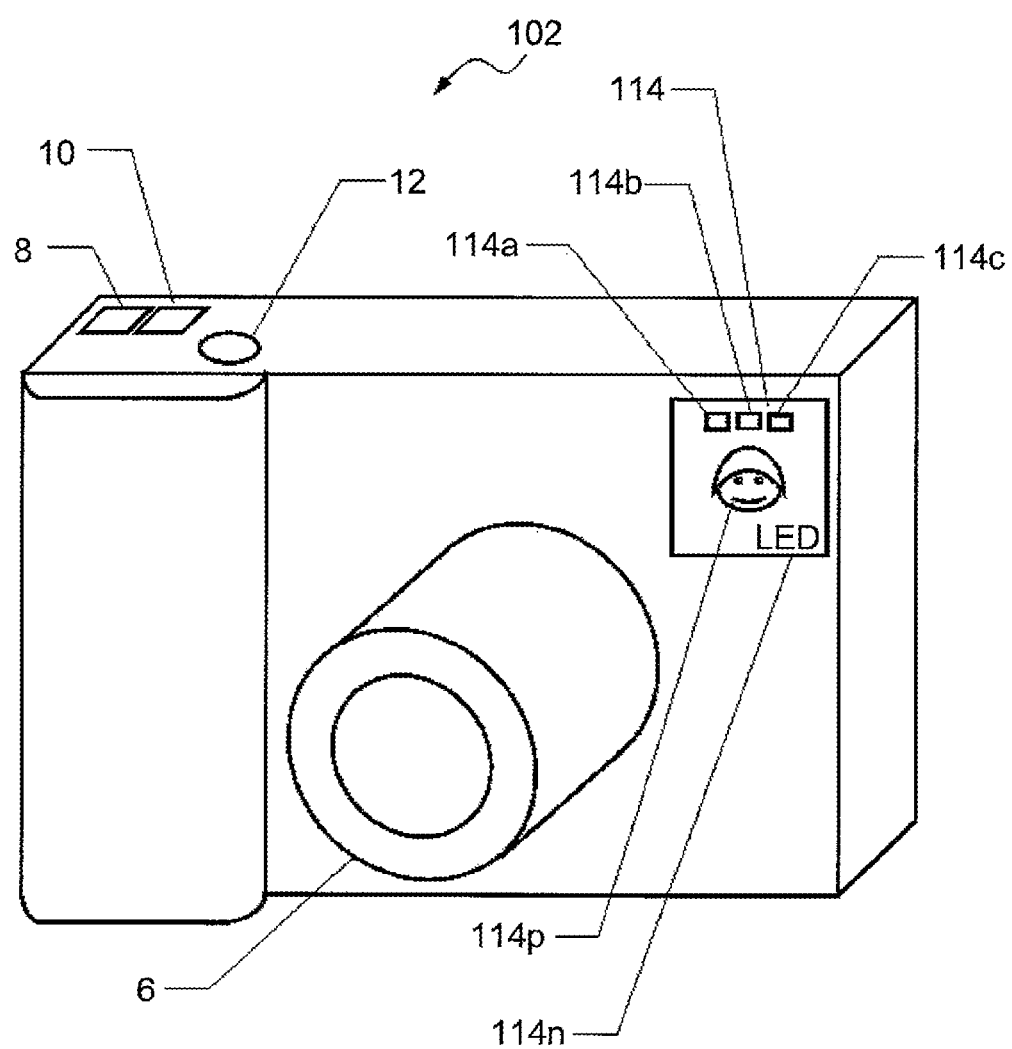
FIG. 12 is a perspective view showing an example 2 of a digital camera according to an embodiment of the present invention (example 2).

FIG. 12 is a perspective view showing an example 2 of the digital camera according to the embodiment of the present invention. The structure is common to the example 1 of FIG. 1 except for the disposition and the like of the image pickup auxiliary light source device; accordingly, corresponding portions are indicated by the same numbers and description of them is skipped. In a digital camera 102 of the example 2, LEDs 114a to 114c are disposed in parallel with one another on the front surface of the camera body 4 to form an image pickup auxiliary light source device 114. Light distributions of the LED 114a to 114c may be the same as one another, but LEDs having different illumination angles may be mingled as in the example 1 of FIG. 2. Besides, the block diagram of the example 1 shown in FIG. 2 and details of the functions shown in FIG. 4 to FIG. 11 are also employable in the example 2 of FIG. 12.

The image pickup auxiliary light by the LED does not contain ultraviolet rays unlike the xenon lamp; accordingly, there is less concern over ultraviolet damage to a retina by direct seeing of the flash light in a image pickup of a new-born baby and the like. To notify this, the image pickup auxiliary light source device 114 of the example 2 of FIG. 12 is provided thereon with a letter representation 114n of "LED" that indicates a safe LED flash and a safety mark 114p that symbolizes a new-born baby. According to this, it is possible to widen the image pickup site that uses the image pickup auxiliary light and to prevent trouble with the surrounding.

INDUSTRIAL APPLICABILITY

The present invention is applicable to an image pickup auxiliary light source device and a digital camera that includes the device.

REFERENCE SIGNS LIST 14a to 14l, 114a to 114c light emitting diodes
electric double-layer capacitor
non-volatile memory
38 power source battery
charge control portion
switchover control portion
114n, 114p notification portions

The invention claimed is:

1. An image pickup auxiliary light source device comprising:
   a light emitting diode;
   an electric double-layer capacitor that supplies electric power to the light emitting diode; and
   a non-volatile memory that stores illumination color information of the light emitting diode for color correction in processing an image picked up under illumination by the light emitting diode,
   wherein the electric double-layer capacitor is supplied with electric power from a rechargeable power source battery, and wherein the image pickup auxiliary light source device further comprises a switchover control portion that performs a switchover between power supply from the electric double-layer capacitor to the light emitting diode and power supply directly from the rechargeable power source battery to the light emitting diode without passing through the electric double-layer capacitor.

2. The image pickup auxiliary light source device according to claim 1, wherein the non-volatile memory stores color information relevant to color temperature and emission spectrum of the light emitting diode on the basis of the color temperature and emission spectrum of xenon gas.

3. The image pickup auxiliary light source device according to claim 2, wherein the non-volatile memory stores color information relevant to deviation of the color temperature and emission spectrum of the light emitting diode from the color temperature and emission spectrum of the xenon gas.

4. The image pickup auxiliary light source device according claim 1, further comprising a rechargeable power source battery and a charge control portion that transfers electric charges from the rechargeable power source battery to the electric double-layer capacitor, and returns accumulated electric charges from the electric double-layer capacitor to the power source battery.

5. The image pickup auxiliary light source device according to claim 1, further comprising a pulse width modulation portion that controls power supply performed from the electric double-layer capacitor to the light emitting diode to control a time-dependent change in illumination intensity of the light emitting diode.

6. The image pickup auxiliary light source device according to claim 1 further comprising an illumination control portion that the illumination intensity of the light emitting diode at a constant intensity within a period.

7. A digital camera comprising the image pickup auxiliary light source device according to claim 6, wherein the illumination control portion is further arranged to vary the constant intensity in accordance with an exposure period of the digital camera.

8. The image pickup auxiliary light source device according to claim 1 further comprising an illumination control portion that increases gradually the illumination intensity of the light emitting diode and decreases the illumination intensity sharply from a peak thereof.

9. A digital camera comprising the image pickup auxiliary light source device according to claim 8, wherein the illumination control portion is arranged to gradually increases the illumination intensity of the light emitting diode during an exposure period of the digital camera and sharply decreases the illumination intensity from the peak thereof.

10. The image pickup auxiliary light source device according to claim 1, comprising a plurality of the light emitting diodes that are different from one another in light distribution, the plurality of the light emitting diodes are supplied with electric power from the electric double layer capacitor.

11. A digital camera comprising the image pickup auxiliary light source device according to claim 10 further comprising
   an illumination control portion that controls separately the plurality of light emitting diodes which are different from one another in light distribution.

12. A digital camera comprising the image pickup auxiliary light source device according to claim 1, the digital camera further comprising an image pickup portion and an image process portion that processes the image picked up by the image pickup portion, wherein the color information of the light emitting diode stored in the non-volatile memory is reflected into color correction by the image process portion in processing the image to correct deviation of the color temperature and emission spectrum of the light emitting diode from the color temperature and emission spectrum of the xenon gas.

13. The digital camera according to claim 12 further comprising:
   a zoom lens; and
   an illumination control portion that changes light distribution of the image pickup auxiliary light source in accordance with a focal distance of the zoom lens.

14. A digital camera according to claim 12 further comprising:
an illumination control portion that changes an illumination intensity of the light emitting diode in accordance with an image pickup distance of the digital camera.

15. The digital camera according to claim 12 further comprising:
an image pickup lens and
a plurality of light emitting diodes that are disposed concentrically around an optical axis of the image pickup lens and are supplied with electric power from the electric double-layer capacitor to generate image pickup auxiliary light.

16. The digital camera according to claim 12 further comprising a camera control portion that receives the color information of the light emitting diode from the non-volatile memory to reflect the color information into color correction by the image process portion in processing the image.

17. The digital camera according to claim 16, wherein the camera control portion is arranged to receive the color information of the light emitting diode from the non-volatile memory when the light emitting diode is built into the digital camera.

18. A digital camera comprising:
a light emitting diode;
an electric double-layer capacitor that is supplied with electric power from a rechargeable power source battery;
an illumination control portion that supplies electric power from the electric double-layer capacitor to the light emitting diode to generate image pickup auxiliary light, and supplies electric power from the rechargeable power source battery to the light emitting diode without passing through the electric double-layer capacitor to perform flicker illumination for reducing red eye; and
a switchover control portion that performs a switchover between the power supply from the electric double-layer capacitor to the light emitting diode and the power supply directly from the rechargeable power source battery to the light emitting diode without passing through the electric double-layer capacitor.

19. A digital camera comprising:
a light emitting diode;
an electric double-layer capacitor that is supplied with electric power from a rechargeable power source battery; and
an illumination control portion that supplies electric power from the electric double-layer capacitor to the light emitting diode to generate image pickup auxiliary light, and supplies electric power from the rechargeable power source battery to the light emitting diode without passing through the electric double-layer capacitor to perform self-timer display illumination; and
a switchover control portion that performs a switchover between the power supply from the electric double-layer capacitor to the light emitting diode and the power supply directly from the rechargeable power source battery to the light emitting diode without passing through the electric double-layer capacitor.

\* \* \* \* \*